(12) United States Patent
Tsuchimoto et al.

(10) Patent No.: US 11,155,294 B2
(45) Date of Patent: Oct. 26, 2021

(54) ELECTRIC POWER STEERING APPARATUS AND ELECTRIC POWER STEERING CONTROL METHOD

(71) Applicant: Mitsubishi Electric Corporation, Tokyo (JP)

(72) Inventors: Yuya Tsuchimoto, Tokyo (JP); Isao Kezobo, Tokyo (JP); Yuji Takatsuka, Hyogo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 241 days.

(21) Appl. No.: 16/481,190

(22) PCT Filed: Mar. 7, 2017

(86) PCT No.: PCT/JP2017/008991
§ 371 (c)(1),
(2) Date: Jul. 26, 2019

(87) PCT Pub. No.: WO2018/163281
PCT Pub. Date: Sep. 13, 2018

(65) Prior Publication Data
US 2019/0389506 A1    Dec. 26, 2019

(51) Int. Cl.
*B62D 5/04*    (2006.01)
*B62D 5/00*    (2006.01)
(Continued)

(52) U.S. Cl.
CPC .......... *B62D 5/0463* (2013.01); *B62D 5/008* (2013.01); *B62D 15/0235* (2013.01); *G01L 5/24* (2013.01)

(58) Field of Classification Search
CPC .. B62D 5/0463; B62D 5/008; B62D 15/0235; B62D 5/046; G01L 5/24
See application file for complete search history.

(56) References Cited

U.S. PATENT DOCUMENTS 8,560,174 B2 * 10/2013 Nishimura ........... B62D 5/0466
                                                        701/41
9,545,944 B2 *  1/2017 Kimura ................ B62D 5/0472
(Continued)

FOREIGN PATENT DOCUMENTS

JP    2010-213550 A    9/2010
JP    4672236 B2       1/2011
JP    5837230 B2      12/2015

OTHER PUBLICATIONS

International Search Report for PCT/JP2017/008991 dated Apr. 25, 2017 [PCT/ISA/210].

*Primary Examiner* — Minnah L Seoh
*Assistant Examiner* — Michael R Stabley
(74) *Attorney, Agent, or Firm* — Sughrue Mion, PLLC; Richard C. Turner

(57) ABSTRACT

An electric power steering apparatus includes: a torque sensor configured to detect a steering torque of a driver; a motor configured to assist in a steering force of the driver; a rotation angle estimation unit configured to estimate a rotation angle of the motor to output an estimated angle; a correction signal calculation unit configured to calculate a correction signal based on the steering torque; a frequency separation unit configured to separate the estimated angle into a first frequency component and a second frequency component; an estimated angle correction unit configured to calculate, as a control angle, a value obtained by adding a second-frequency-component corrected signal, which is obtained by correcting the second frequency component based on the correction signal, to the first frequency component; and an electric power supply unit configured to supply electric power to the motor based on the control angle.

12 Claims, 9 Drawing Sheets

(51) Int. Cl.
*B62D 15/02* (2006.01)
*G01L 5/24* (2006.01)

(56) References Cited

U.S. PATENT DOCUMENTS

| 9,660,565 B2 * | 5/2017 | Kuramitsu | B62D 5/046 |
| 2018/0099692 A1 * | 4/2018 | Oya | B62D 15/021 |
| 2019/0152514 A1 * | 5/2019 | Itamoto | H02K 11/33 |

* cited by examiner

ELECTRIC POWER STEERING APPARATUS AND ELECTRIC POWER STEERING CONTROL METHOD

CROSS REFERENCE TO RELATED APPLICATIONS

This application is a National Stage of International Application No. PCT/JP2017/008991, filed on Mar. 7, 2017.

TECHNICAL FIELD

The present invention relates to an electric power steering apparatus capable of estimating a rotation angle of a motor without using a rotation angle sensor, and a method of controlling an electric power steering.

BACKGROUND ART

As disclosed in Patent Literature 1 and Patent Literature 2, some related-art electric power steering apparatus are configured to estimate a rotation angle of a motor, to thereby execute sensorless control that uses an estimated angle signal (hereinafter also referred to as "estimated angle") in place of a rotation angle detected by a sensor. Moreover, there are not only electric power steering apparatus but also many control apparatus configured to drive a motor through the sensorless control that uses the estimated angle as disclosed in Patent Literature 3.

In the sensorless control that uses the estimated angle, when a difference (hereinafter also referred to as "estimation error") occurs between the rotation angle of the motor and the estimated angle, the motor cannot generate a desired torque, and hence a motor torque fluctuates, and a vibration occurs. Therefore, the electric power steering apparatus configured to execute the sensorless control that uses the estimated angle has such a problem that a driver has difficulty in steering due to the torque fluctuation caused by the estimation error. Causes for the occurrence of the estimation error vary depending on estimation methods, such as errors (hereinafter also referred to as "parameter errors") in a resistance value and an inductance of the motor, which are set as parameters in calculation equations for the estimated angle, and an estimation delay.

To address such a problem, in Patent Literature 1, when there is a negative correlation between a control angle, which is the estimated angle, and the motor torque, the control angle, namely, the estimated angle, is corrected by decreasing a limit value on an added angle corresponding to a change amount of the estimated angle, namely, an estimated speed. The negative correlation refers to such a correlation that the motor torque decreases as the control angle, namely, the estimated angle increases. A derivative of the steering torque has a sign opposite to that of a direction of a change in the motor torque. Therefore, when the sign of the added angle (estimated speed) and the sign of the derivative of the steering torque are the same signs, it can be determined that the control angle and the motor torque have the negative correlation.

CITATION LIST

Patent Literature

[PTL 1] JP 2010-213550 A
[PTL 2] JP 5837230 B2
[PTL 3] JP 4672236 B2

SUMMARY OF INVENTION

Technical Problem

The correction method for a control angle, namely, an estimated angle disclosed in Patent Literature 1 correct the estimated angle when the sign of the added angle (estimated speed) and the sign of the derivative of the steering torque are the same signs, but cannot correct the estimated angle when, for example, the sign of the added angle (estimated speed) and the sign of the derivative of the steering torque are opposite signs and the estimation error thus exists.

Moreover, when a steering wheel is additionally steered, the steering torque increases, and the derivative of the steering torque becomes positive. However, the rotation angle of the motor and the control angle also increase, and the added angle a also becomes positive. Therefore, it is determined that the negative correlation exists, and the added angle is limited so as to be small. As a result, when the steering speed is high, that is, the rotation speed of the motor is high, the added angle is limited so as to be small, thereby increasing the estimation error. Therefore, there is such a problem that the effect of the correction is exhibited only when the steering speed is low, that is, the rotation speed of the motor is low.

Moreover, in Patent Literature 1, the control angle (estimated angle) is corrected to be small by gradually reducing the limit value on the added angle (estimated speed). However, the correction is not made through use of a value corresponding to a value of an actual rotation angle, and hence the accuracy of the correction is insufficient.

The present invention has been made in view of the above-mentioned problems, and therefore has an object to provide an electric power steering apparatus and a method of controlling an electric power steering, which are capable of achieving stable sensorless control having a small vibration by correcting an estimation error contained in an estimated angle to suppress a torque fluctuation caused by the estimation error.

Solution to Problem

According to one embodiment of the present invention, there is provided an electric power steering apparatus including: a torque sensor configured to detect a steering torque of a driver; a motor configured to assist in a steering force of the driver; a rotation angle estimation unit configured to estimate a rotation angle of the motor to output an estimated angle; a correction signal calculation unit configured to calculate a correction signal based on the steering torque; a frequency separation unit configured to separate the estimated angle into a first frequency component and a second frequency component; an estimated angle correction unit configured to calculate, as a control angle, a value obtained by adding a second-frequency-component corrected signal, which is obtained by correcting the second frequency component based on the correction signal, to the first frequency component; and an electric power supply unit configured to supply electric power to the motor based on the control angle.

Advantageous Effects of Invention

According to one embodiment of the present invention, it is possible to provide the electric power steering apparatus and the like, which are capable of achieving stable sensorless control having a small vibration by correcting the estimation error contained in the estimated angle to suppress the torque fluctuation caused by the estimation error.

DESCRIPTION OF EMBODIMENTS

According to the present invention, a second frequency component, which is a vibration component separated from an estimated angle, can be corrected through use of a correction signal calculated based on a steering torque as a value corresponding to an actual rotation angle, and hence an estimation error in the component of the rotation angle similar to the steering torque can be reduced.

Moreover, the correction can accurately be made through the correction that uses the value corresponding to the actual rotation angle, and hence a torque fluctuation caused by the estimation error can be suppressed.

Further, even when a speed of the steering is high, a frequency equal to or lower than a frequency of the steering is not contained in the second frequency component, and hence the second frequency component, which is the vibration component, can be corrected without being influenced by the steering of a driver. The torque fluctuation caused by the estimation error can be suppressed through the accurate correction, and it is thus possible to provide an electric power steering apparatus and the like capable of performing stable sensorless control with a small vibration.

Now, an electric power steering apparatus and a method of controlling an electric power steering according to each of embodiments of the present invention are described with reference to the drawings. In each of the embodiments, the same or corresponding portions are denoted by the same reference symbols, and the overlapping description thereof is omitted.

First Embodiment

Figure 1:
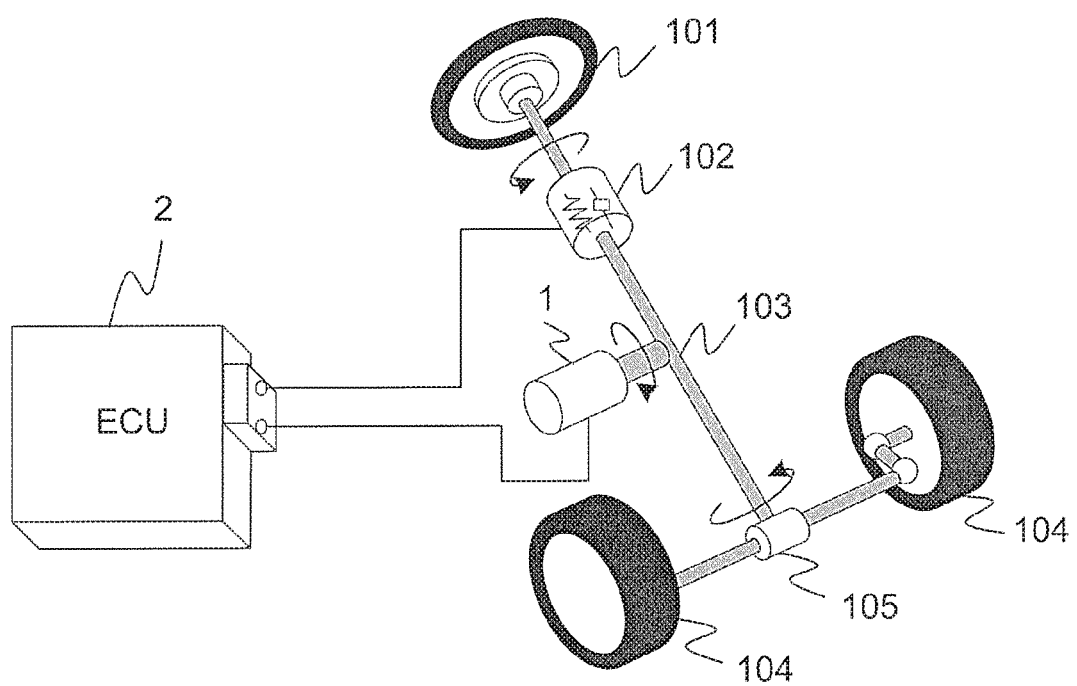
FIG. 1 is a schematic configuration diagram for illustrating an example of a configuration of an electric power steering apparatus according to the present invention.

FIG. 1 is a diagram for illustrating an example of a schematic configuration of an electric power steering apparatus according to the present invention. In FIG. 1, to the electric power steering apparatus, a steering wheel 101, a steering shaft 103, a rack-and-pinion gear 105, wheels 104, a motor 1, an electronic control unit (ECU) 2, and a torque sensor 102 are mounted. The motor 1 is configured to assist in a steering force of the driver. The ECU 2 is configured to supply electric power for driving the motor. The torque sensor 102 is configured detect a steering torque of the driver.

In FIG. 1, the steering torque applied from the driver (not shown) to the steering wheel 101 is transmitted to a rack through a torsion bar of the torque sensor 102, the steering shaft 103, and the rack-and-pinion gear 105, to thereby steer the wheels 104.

Figure 2:
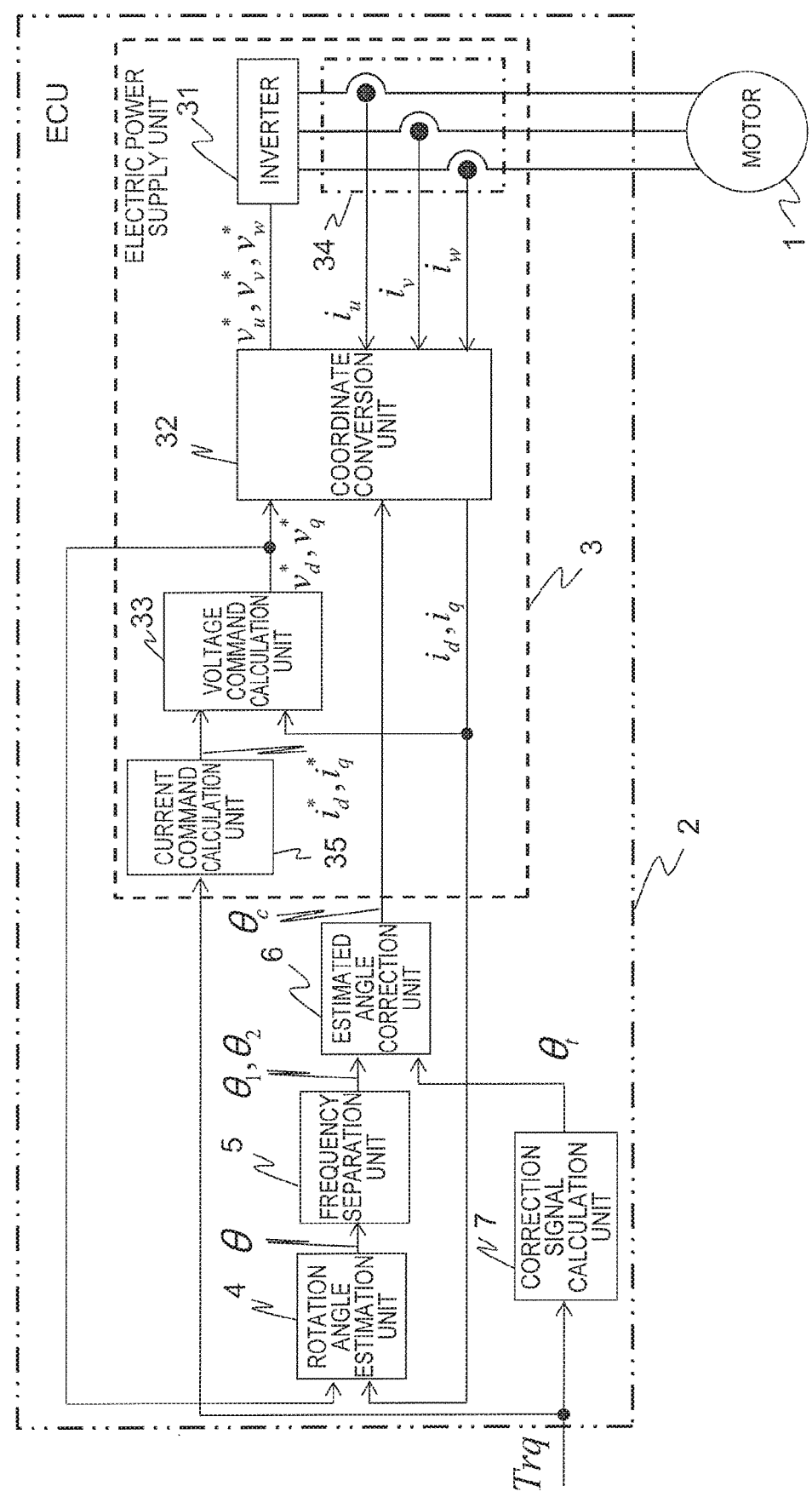
FIG. 2 is a control block diagram for illustrating an example of a configuration of an ECU of FIG. 1.

FIG. 2 is a control block diagram for illustrating an example of a configuration of the ECU of FIG. 1. The motor 1 generates a motor torque Tm as output through the electric power supplied from an electric power supply unit 3 in the ECU 2. The motor torque Tm is transmitted to the steering shaft 103, to thereby reduce the steering torque required to be applied by the driver during the steering. As the motor 1, it is only required to use a generally well-known motor such as a permanent magnet synchronous motor or an induction motor. In the first embodiment, the motor 1 is a three-phase AC permanent-magnet synchronous motor.

The electric power supply unit 3 includes an inverter 31, a coordinate conversion unit 32, a voltage command calculation unit 33, a current detector 34, and a current command calculation unit 35, and supplies the electric power to the motor 1 based on a control angle θc.

The current command calculation unit 35 calculates a d-axis current command id* and a q-axis current command iq*. The d-axis current command id* and the q-axis current command iq* are command values relating to the motor torque Tm, which is the output of the motor 1. A method of calculating the d-axis current command id* and the q-axis current command iq* is not particularly limited. In this case, the d-axis current command id* is set to 0, and the q-axis current command iq* is determined in accordance with a steering torque Trq. The d-axis current command id* may be determined in accordance with a rotation speed of the motor.

The voltage command calculation unit 33 generates a d-axis voltage command vd* and a q-axis voltage command vq* so that the d-axis current command id* and the q-axis current command iq* and a d-axis detected current id and a q-axis detected current iq match each other in respective axis components. A configuration of feeding back the detected currents is employed in this case, but the voltage commands may be calculated by feed-forward without using the detected currents.

The current detector 34 detects a u-phase detected current iu, a v-phase detected current iv, and a w-phase detected current iw as currents flowing in respective phases of the motor 1. Three phase currents are detected in this case, but the currents in a part of the phases may not be detected, and may be estimated from the currents in the other detected phases.

The coordinate conversion unit 32 applies coordinate conversion to the d-axis voltage command vd* and the q-axis voltage command vq* based on the control angle θc, to thereby generate a u-phase voltage command vu*, a v-phase voltage command vv*, and a w-phase voltage command vw*. Further, the coordinate conversion unit 32 applies coordinate conversion to the u-phase detected current iu, the v-phase detected current iv, and the w-phase detected current iw based on the control angle θc, to thereby generate the d-axis detected current id and the q-axis detected current iq.

The inverter 31 applies, as electric power, a three-phase AC voltage based on the u-phase voltage command vu*, the v-phase voltage command vv*, and the w-phase voltage command vw* to the motor 1, to thereby generate the motor torque Tm.

The ECU 2 further includes a rotation angle estimation unit 4, a frequency separation unit 5, an estimated angle correction unit 6, and a correction signal calculation unit 7.

The rotation angle estimation unit 4 estimates a rotation angle θe of the motor, and outputs an estimated value as an estimated angle θ. A method of estimating the rotation angle θe of the motor is not particularly limited, but, as an example, a description is given of a configuration of using an induced voltage for the estimation as disclosed in Patent Literature 3. This estimation method uses such a fact that the induced voltage is proportional to a rotation speed of the motor, namely, a derivative of the rotation angle. The d-axis voltage command vd*, the q-axis voltage command vq*, the d-axis detected current id, and the q-axis detected current iq are set as inputs, and an observer is formed as given by Expression (1) to Expression (6) to calculate the estimated angle θ.

$$\theta = \int w \, dt \tag{1}$$

$$w = wr0 - \frac{e04}{pdr0} \tag{2}$$

$$wr0 = \left(kp + \frac{ki}{s}\right)(eq \cdot pdr0) \tag{3}$$

$$\frac{d}{dt}\begin{pmatrix} id0 \\ iq0 \\ pdr0 \end{pmatrix} = \tag{4}$$

$$\begin{pmatrix} -\frac{R}{Ld} & \frac{Lq}{Ld}w & 0 \\ -\frac{Ld}{Lq}w & -\frac{R}{Lq} & -\frac{wr0}{Lq} \\ 0 & 0 & 0 \end{pmatrix}\begin{pmatrix} id0 \\ iq0 \\ pdr0 \end{pmatrix} + \begin{pmatrix} \frac{1}{Ld} & 0 \\ 0 & \frac{1}{Lq} \\ 0 & 0 \end{pmatrix}\begin{pmatrix} vd^* \\ vq^* \end{pmatrix} = \begin{pmatrix} e01 \\ e02 \\ e03 \end{pmatrix}$$

$$\begin{pmatrix} e01 \\ e02 \\ e03 \\ e04 \end{pmatrix} = \begin{pmatrix} g11 & g12 \\ g21 & g22 \\ g31 & g32 \\ g41 & g42 \end{pmatrix}\begin{pmatrix} ed \\ eq \end{pmatrix} \tag{5}$$

$$\begin{pmatrix} ed \\ eq \end{pmatrix} = \begin{pmatrix} id0 - id \\ iq0 - iq \end{pmatrix} \tag{6}$$

In the expressions,
w and w0: estimated speeds,
id0: d-axis estimated current,
iq0: q-axis estimated current,
pdr0: estimated magnetic flux,
ed: d-axis deviation,
eq: q-axis deviation,
R: resistance value of motor,
Ld: d-axis inductance of motor,
Lq: q-axis inductance of motor,
s: differential operator of Laplace transform,
kp, ki, g11, g12, g21, g22, g31, g32, g41, and g42: feedback gains for calculating estimated angle θ, and
e01, e02, e03, and e04: intermediate variables of calculation.

In this estimation method, the resistance value R and the inductances Ld and Lq of the motor are set as the parameters, and hence an estimation error is caused by parameter errors.

Figure 3:
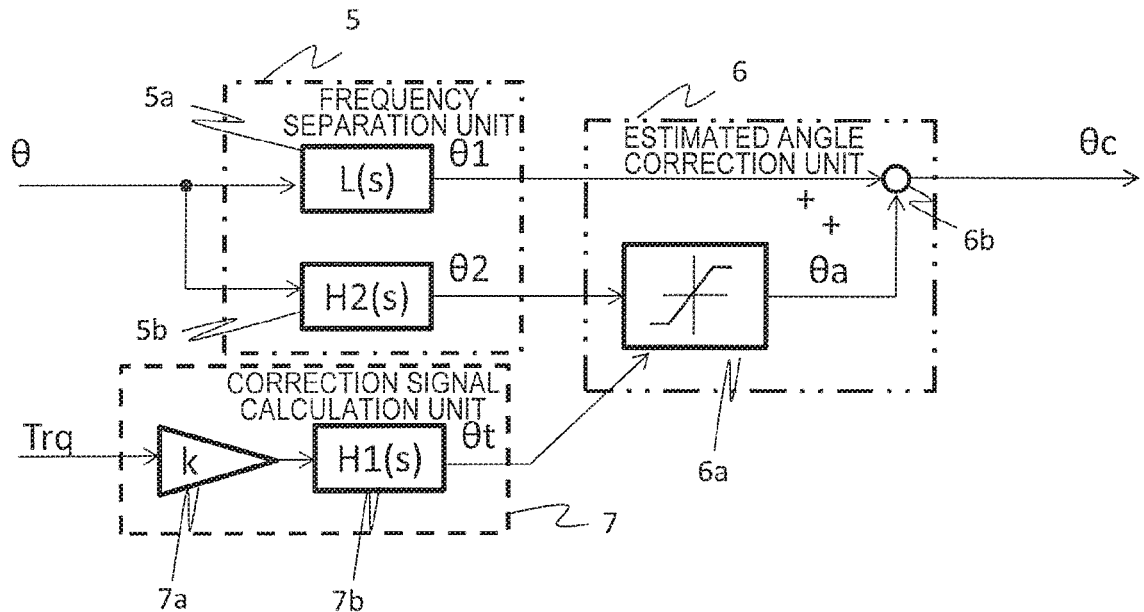
FIG. 3 is a block diagram for illustrating calculation of a control angle in a first embodiment of the present invention.

A description is now given of the calculation of the control angle θc. FIG. 3 is a block diagram for illustrating a process of the calculation of the control angle θc. The frequency separation unit 5 uses a filter L(s), which is a first filter 5a, and a filter H2(s), which is a second filter 5b, to obtain a first frequency component θ1 and a second frequency component θ2, respectively, based on the estimated angle θ calculated by the rotation angle estimation unit 4. The correction signal calculation unit 7 calculates a correction signal θt based on the steering torque Trq detected by the torque sensor 102. The correction signal θt is calculated by multiplying a conversion gain (k) in the conversion unit 7a, and then extracting a vibration component through the filter H1(s), which is a third filter 7b. The estimated angle correction unit 6 corrects the second frequency component θ2 based on the correction signal θt in a calculation unit 6a, to thereby calculate a second-frequency-component corrected signal θa. Further, the estimated angle correction unit 6 further adds the second-frequency-component corrected signal θa to the first frequency component θ1 in an addition unit 6b, to thereby calculate the control angle θc. A detailed description is now given of the frequency separation unit 5, the estimated angle correction unit 6, and the correction signal calculation unit 7.

The correction signal calculation unit 7 calculates the correction signal θt based on the steering torque Trq detected by the torque sensor 102. A description is now given of calculation of the correction signal θt.

The torque sensor 102 detects the steering torque Trq based on an amount of torsion between an angle on the steering wheel side, which is a top side of the torsion bar, and an angle on the motor side, which is a bottom side of the torsion bar. When rigidity of the torsion bar is represented by ks, a relationship between the steering torque Trq and the rotation angle θe of the motor is given by Expression (7) through use of a steering angle θh, a number of pole pairs Pm of the motor 1, and a gear ratio Gn.

$$Trq = k_s\left(\theta_h - \frac{1}{G_n \cdot P_m}\theta_e\right) \tag{7}$$

In this case, the steering angle θh depends on the frequency of the steering of the driver. Therefore, the steering torque can be approximated by focusing on a frequency band higher than a main resonant frequency of the electric power steering apparatus as given by Expression (8). The conversion gain k indicating a ratio between the steering torque Trq and the rotation angle θe of the motor is given by Expression (9). In general, the vibration occurs at a frequency equal to or higher than the resonant frequency, and hence the vibration component can accurately be extracted in accordance with this conversion gain. An error occurs between the steering frequency and the resonant frequency, but a vibration does not usually occur, which does not thus pose a problem. As required, the accuracy of the conversion can be increased by adding a dynamic characteristic to the conversion gain through an inverse model from the angle to the torque.

$$Trq \cong -k_s \cdot \frac{1}{G_n \cdot P_m} \theta_e = \frac{1}{k} \cdot \theta_e \qquad (8)$$

$$k = -\frac{G_n \cdot P_m}{k_s} \qquad (9)$$

As described above, the approximation through Expression (8) focuses on the frequency higher than the frequency of the steering of the driver. Therefore, as given by Expression (10), the correction signal θt is calculated by multiplying the steering torque Trq by the conversion gain k in the conversion unit 7a, and applying the filter H1(s) (7b) to extract a frequency component higher than the frequency of the steering of the driver.

$$\theta_1 = H_1(s) \cdot k \cdot Trq \qquad (10)$$

In this case, the filter H1(s) (7b) is a first-order high-pass filter given by Expression (11). In general, the frequency at which the driver can steer is approximately equal to or lower than 3 Hz. Moreover, for example, the steering frequency during a lane change is approximately 0.2 Hz, and it is often the case that the steering is performed at such a low frequency. Thus, a cutoff frequency ωh1 is set to 3 Hz to extract a frequency component higher than the frequency of the usual steering of the driver.

$$H_1(s) = \frac{s}{s + \omega_{h1}} \qquad (11)$$

With the above-mentioned configuration, the correction signal θt can be calculated as a value corresponding to an actual rotation angle based on the steering torque Trq in accordance with the approximation given by Expression (8). The correction signal θt calculated from the steering torque is the value corresponding to the actual rotation angle θe. Thus, correction can be made at a higher accuracy, and an estimation error can be reduced for the component of the rotation angle similar to the steering torque Trq. Moreover, the correction signal calculation unit 7 is configured to multiply the steering torque by the conversion gain, and thus the steering torque can be converted to the value corresponding to the rotation angle of the motor. As a result, the second frequency component θ2 can accurately be corrected.

The frequency separation unit 5 separates, through the filtering, the estimated angle θ into the first frequency component θ1 containing a steering component and the second frequency component θ2 containing a vibration component as given by Expression (12).

In this case, the steering component is a frequency component of the steering force of the driver, and the vibration component indicates a mechanical vibration component of the electric power steering apparatus.

$$\begin{cases} \theta_1 = L(s) \cdot \theta \\ \theta_2 = H(s) \cdot \theta \end{cases} \qquad (12)$$

The filter H2(s) in Expression (12) is set in accordance with Expression (13). The filter H2(s) is constructed by the same first-order high-pass filter as the filter H1(s) so that the correction signal θt and the second frequency component θ2 have the same or similar frequency components. Moreover, the cutoff frequency ωh2 is set to 3 Hz, which is the same as the cutoff frequency will of the filter H1(s).

$$H_2(s) = \frac{s}{s + \omega_{h2}} \qquad (13)$$

The correction signal θt and the second frequency component θ2 have the similar or the same frequency components, and thus the second frequency component and the correction signal are expected to match each other when the estimation error does not exist. When a difference exists therebetween, it can be determined that the estimation error exists, and correction can be made without excess or deficiency. Therefore, the estimated angle θ can be accurately corrected, and hence the torque fluctuation caused by the estimation error can be suppressed. Moreover, the filter L(s) in Expression (12) is set in accordance with Expression (14).

Figure 4A:
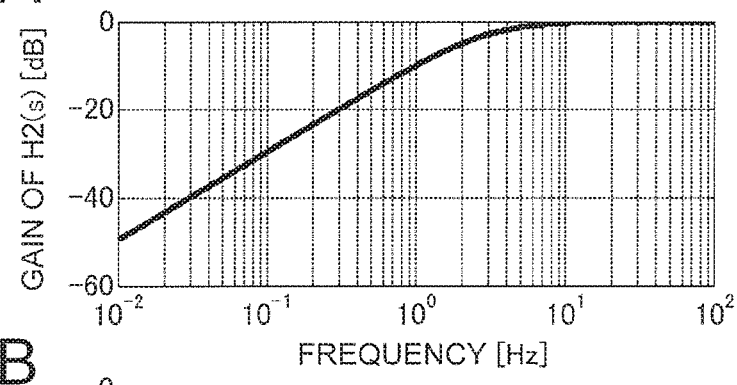
FIGS. 4A and 4B are Bode diagrams for showing gain characteristics of a filter H2($s$) and a filter L(s) in the first embodiment of the present invention.
Figure 4B:
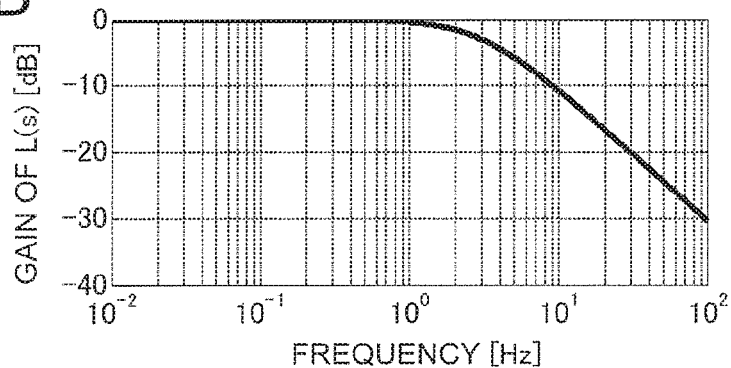

FIG. 4 are Bode diagrams for showing gain characteristics of the filter H2(s) (5b) and the filter L(s) (5a) in the first embodiment. FIG. 4A is a diagram for showing the gain characteristic of the filter H2(s). FIG. 4B is a diagram for showing the gain characteristic of the filter L(s). The filter H2(s) extracts the frequency component higher than the frequency of the usual steering of the driver, and hence the filter L(s) given by Expression (14) can calculate the first frequency component θ1 as the signal containing the frequency component of the steering force of the driver. The first frequency component θ1 separated from the estimated angle θ contains the frequency component of the steering force of the driver. With this configuration, the steering component of the control angle θc is calculated based on the estimated angle θ, and the second frequency component θ2 can be corrected in terms of the vibration component. Thus, the torque fluctuation caused by the estimation error can be suppressed.

$$L(s) = 1 - H_2(s) = \frac{\omega_{h2}}{s + \omega_{h2}} \qquad (14)$$

Further, when the filter L(s) is set in accordance with Expression (14), a sum of the filter H2(s) and the filter L(s) is one, and the original input signal can thus be restored. As a result, there is provided such an additional effect that, when the estimation error does not exist, the second-frequency-component corrected signal θa is the second frequency component, and the original estimated angle θ can be restored by adding the first frequency component.

Figure 5:
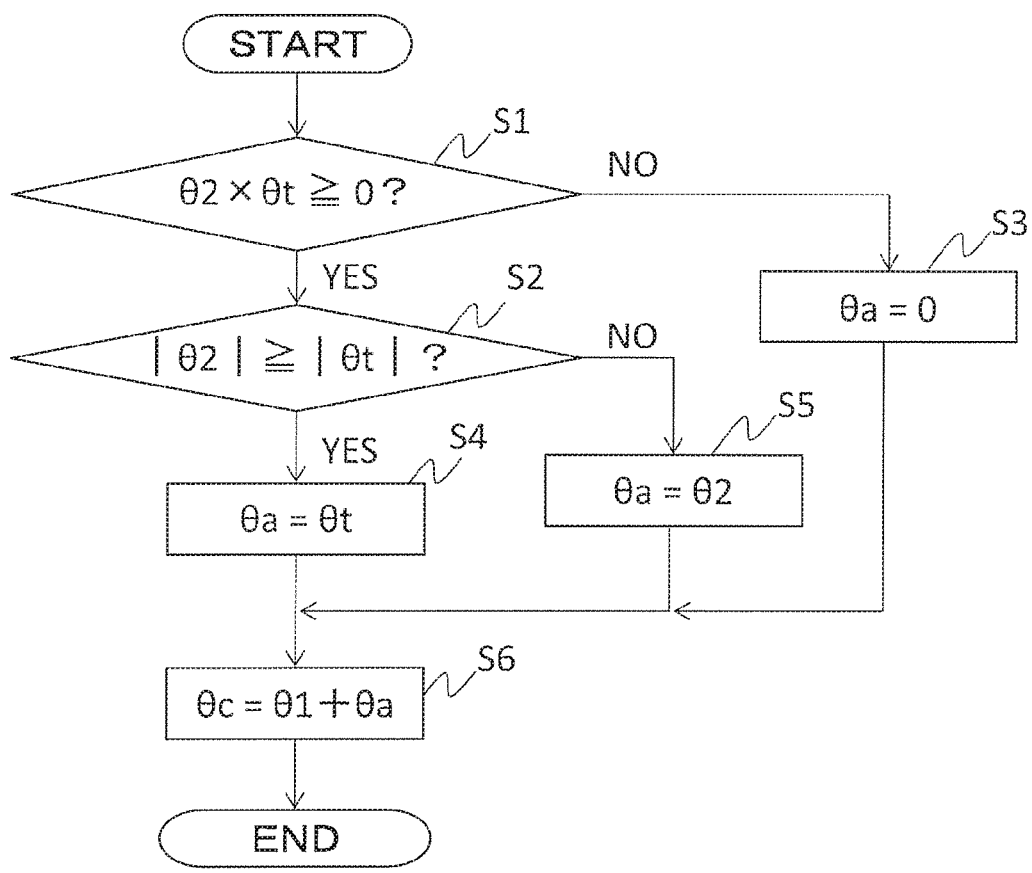
FIG. 5 is a flowchart for illustrating processing by an estimated angle correction unit in the first embodiment of the present invention.

The estimated angle correction unit 6 first corrects the second frequency component θ2 based on the correction signal θt in the calculation unit 6a, to thereby calculate the second-frequency-component corrected signal θa. Then, the second-frequency-component corrected signal θa is added to the first frequency component θ1 in the addition unit 6b, to thereby calculate the control angle θc. FIG. 5 is a flowchart for illustrating the processing by the estimated angle correction unit 6.

The second-frequency-component corrected signal θa is calculated so as to correct the second frequency component θ2 based on a relationship in plus or minus sign between the second frequency component $\theta 2$ and the correction signal $\theta t$. Specifically, when the second frequency component $\theta 2$ and the correction signal $\theta t$ have the same signs in the relationship in sign (Step S1), a value smaller in absolute value out of the second frequency component $\theta 2$ and the correction signal $\theta t$ is corrected as the second-frequency-component corrected signal $\theta a$ (Step S2, Step S4, and Step S5). In Step S2, the magnitudes of the absolute values are compared with each other. When $|\theta 2| \geq |\theta t|$, $\theta t$ is set as $\theta a$ in Step S4. When $|\theta 2| < |\theta t|$, $\theta 2$ is set as $\theta a$ in Step S5. The determination of whether or not the second frequency component $\theta 2$ and the correction signal $\theta t$ have the same signs in the relationship in sign is made based on, for example, whether or not a product of the second frequency component $\theta 2$ and the correction signal $\theta t$ is equal to or more than 0 as in Step S1.

Moreover, when the second frequency component $\theta 2$ and the correction signal $\theta t$ have different signs in the relationship in sign (Step S1), the second-frequency-component corrected signal $\theta a$ obtained by correcting the second frequency component $\theta 2$ is set to 0 (Step S3).

The control angle $\theta c$ is calculated by adding the second-frequency-component corrected signal $\theta a$ to the first frequency component $\theta 1$ (Step S6), With the above-mentioned configuration, the estimated angle correction unit 6 is configured to correct the second frequency component based on the relationship in sign between the second frequency component $\theta 2$ and the correction signal $\theta t$, and appropriate correction can thus be made in accordance with the relationship in sign between the second frequency component and the correction signal.

Moreover, the estimated angle correction unit 6 is configured to set a value smaller in absolute value out of the second frequency component $\theta 2$ and the correction signal $\theta t$ as the second-frequency-component corrected signal $\theta a$ when the second frequency component $\theta 2$ and the correction signal $\theta t$ have the same signs. Thus, the vibration component contained in the estimated angle $\theta$ is close to the actual vibration component, and hence an increase in the estimation error can be suppressed.

Moreover, the estimated angle correction unit 6 is configured to set the second-frequency-component corrected signal $\theta t$ to 0 when the second frequency component $\theta 2$ and the correction signal $\theta t$ have different signs. Thus, when the second frequency component $\theta 2$ and the correction signal $\theta t$ have different signs, an increase in the estimation error can be suppressed by setting the second frequency component $\theta 2$ to 0 because reliability of any one of the second frequency component $\theta 2$ and the correction signal $\theta t$ is low.

Figure 6A:
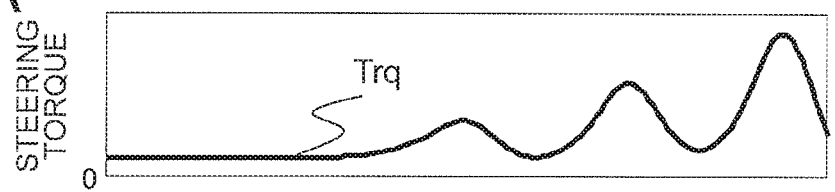
FIGS. 6A-6D are graphs for showing an example of time response waveforms of respective values obtained when a correction in the present invention is not made.
Figure 6B:
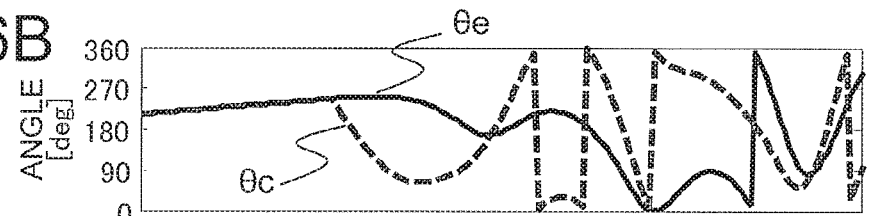
Figure 6C:
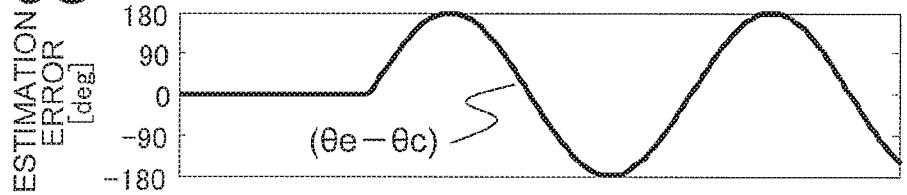
Figure 6D:
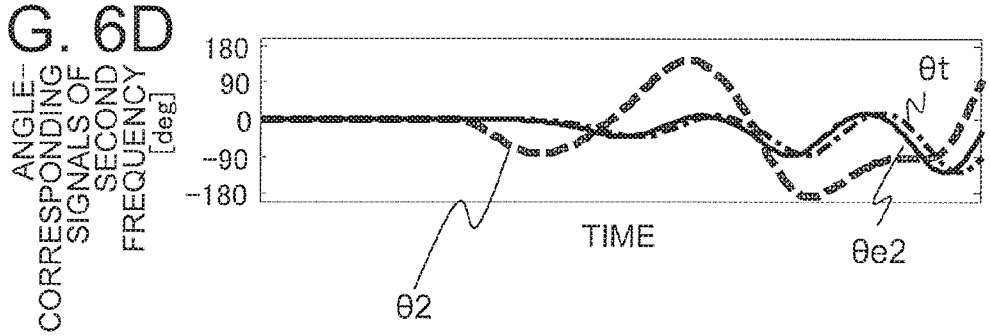

FIGS. 6A-6D are graphs for showing an example of time response waveforms of respective values obtained when the correction in the present invention is not made. FIGS. 7A-7D are graphs for showing an example of time response waveforms of the respective values obtained when the correction in the present invention is made. An effect of the present invention can be confirmed from FIGS. 6A-6D and FIGS. 7A-7D. Both in FIGS. 6A-6D and FIGS. 7A-7D, the respective vertical axes indicate the steering torque Trq in FIG. 6A and FIG. 7A, the actual rotation angle $\theta e$ of the motor and the angle of the control angle $\theta c$ in FIG. 6B and FIG. 7B, the estimation error ($=\theta e - \theta c$) in FIG. 6C and FIG. 7C, and angle-corresponding signals of the second frequency in FIG. 6D and FIG. 7D, and the horizontal axis indicates time. In FIG. 6D and FIG. 7D, as the angle-corresponding signals of the second frequency, the second frequency component $\theta 2$ separated from the estimated angle $\theta$, the correction signal $\theta t$ calculated from the steering torque, and a second-frequency-component corresponding amount $\theta e 2$ separated from the rotation angle $\theta e$ of the motor are shown. Moreover, when the correction is not made, a relationship of $\theta c = \theta$ is established.

From FIGS. 6A-6D, it is appreciated that a vibration occurs in the steering torque Trq in FIG. 6A subsequently to a time point at which the estimation error ($\theta e - \theta c$) occurs in FIG. 6C. Moreover, the second-frequency-component corresponding amount $\theta e 2$ in FIG. 6D separated from the rotation angle $\theta e$ of the motor is greatly different from the second frequency component $\theta 2$ separated from the estimated angle $\theta$, but almost match the correction signal $\theta t$ calculated from the steering torque. Therefore, an accurate correction can be expected from the correction based on the correction signal $\theta t$.

Figure 7A:
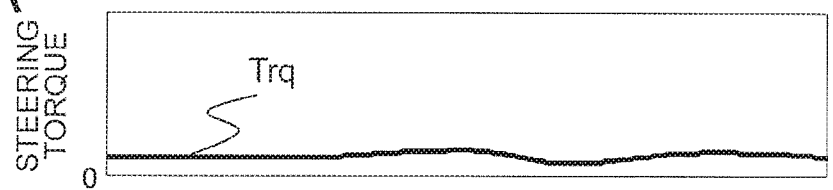
FIGS. 7A-7D are graphs for showing an example of time response waveforms of the respective values obtained when the correction in the present invention is made.
Figure 7B:
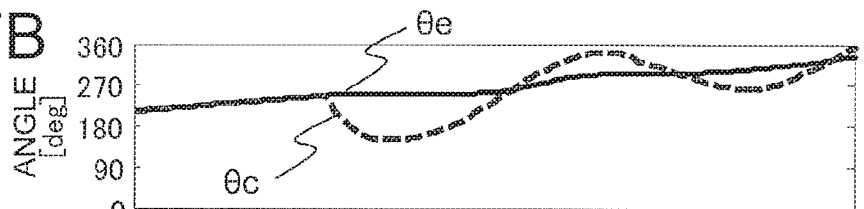
Figure 7C:
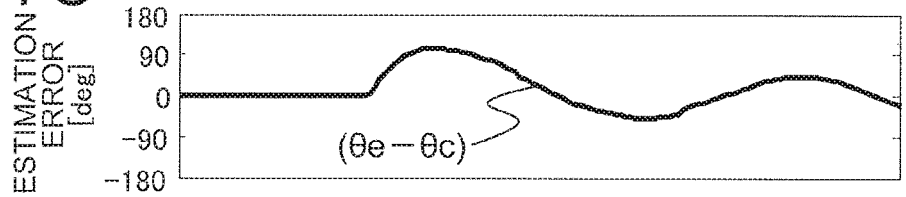
Figure 7D:
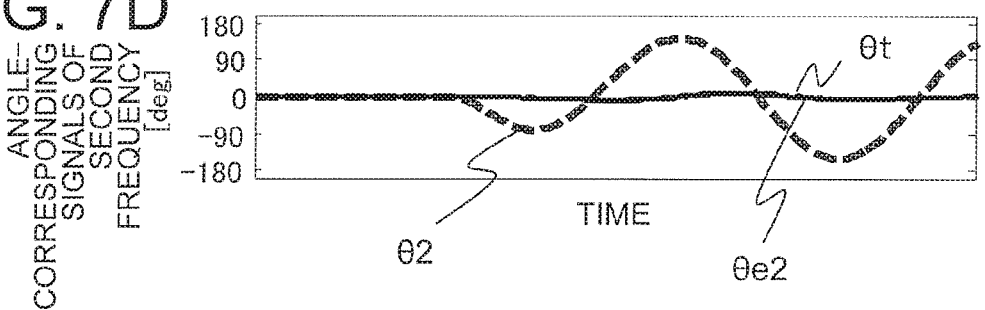

From FIGS. 7A-7D, it is appreciated that the estimation error ($\theta e - \theta c$) can be decreased as shown in FIG. 7C by correcting the difference between the second-frequency-component corresponding amount $\theta e 2$ separated from the rotation angle $\theta e$ of the motor shown in FIG. 7D and the second frequency component $\theta 2$ separated from the estimated angle $\theta$ based on the correction signal $\theta t$ almost matching the second-frequency-component corresponding amount $\theta e 2$ separated from the rotation angle $\theta e$ of the motor. Moreover, the torque fluctuation can be suppressed through the reduction in the estimation error ($\theta e - \theta c$), thereby being able to achieve a reduction in the vibration.

As described above, according to the first embodiment of the present invention, it is possible to provide the electric power steering apparatus including: the torque sensor 102 configured to detect a steering torque of a driver; the motor 1 configured to assist in a steering force of the driver; the rotation angle estimation unit 4 configured to estimate a rotation angle $\theta e$ of the motor to output an estimated angle $\theta$; the correction signal calculation unit 7 configured to calculate a correction signal $\theta t$ based on the steering torque Trq; the frequency separation unit 5 configured to separate the estimated angle $\theta$ into a first frequency component $\theta 1$ and a second frequency component $\theta 2$; the estimated angle correction unit 6 configured to calculate, as a control angle $\theta c$, a value obtained by adding a second-frequency-component corrected signal $\theta a$, which is obtained by correcting the second frequency component $\theta 2$ based on the correction signal $\theta t$, to the first frequency component $\theta 1$; and the electric power supply unit 3 configured to supply electric power to the motor 1 based on the control angle $\theta c$.

In this case, the first frequency component $\theta 1$ contains the steering component, which is the frequency component of the steering force of the driver, and the second frequency component $\theta 2$ contains the mechanical vibration component of the electric power steering apparatus.

With this configuration, the second frequency component $\theta 2$, which is the vibration component separated from the estimated angle $\theta$, can be corrected through use of the correction signal $\theta t$ calculated based on the steering torque Trq as the value corresponding to the actual rotation angle $\theta e$, and hence the estimation error ($\theta e - \theta c$) in the component of the rotation angle similar to the steering torque Trq can be reduced. The correction can accurately be made through the correction that uses the value corresponding to the actual rotation angle, and hence a torque fluctuation caused by the estimation error ($\theta e - \theta c$) can be suppressed. Further, even when a speed of the steering is high, a frequency equal to or lower than a frequency of the steering is not contained in the second frequency component $\theta 2$, and hence the second frequency component $\theta 2$, which is the vibration component, can be corrected without being influenced by the steering of the driver.

Further, the correction signal (θt) is based on a value of a frequency component that is extracted from the steering torque (Trq) as the same frequency component as the second frequency component (θ2).

The second frequency component θ2 separated from the estimated angle θ and the steering torque Trq, which is the same frequency component, are correlated with each other. Due to this correlation, when the estimation error (θe−θc) does not exist, the second frequency component θ2 and the correction signal θt are expected to match each other. Therefore, when there is a difference, it can thus be determined that the estimation error (θe−θc) exists, and the correction can be made without excess or deficiency. As a result, the estimated angle θ can accurately be corrected, and hence the torque fluctuation caused by the estimation error (θe−θc) can be suppressed.

Moreover, the first frequency component θ1 contains the frequency component of the steering force of the driver, and thus the steering component of the control angle θc can be calculated based on the estimated angle θ, and the vibration component can correct the second frequency component θ2. Thus, the torque fluctuation caused by the estimation error (θe−θc) can be suppressed.

Moreover, the correction signal calculation unit 7 is configured to multiply the steering torque Trq by the conversion gain k, and thus the steering torque Trq can be converted to the value corresponding to the rotation angle θe of the motor. As a result, the second frequency component θ2 can accurately be corrected.

In this case, the correction signal calculation unit 7 is configured to multiply the steering torque Trq by the conversion gain (k) indicating the ratio between the steering torque Trq and the rotation angle θe of the motor 1.

Moreover, the estimated angle correction unit 6 is configured to correct the second frequency component θ2 based on the relationship in plus or minus sign between the second frequency component θ2 and the correction signal θt, and appropriate correction can thus be made in accordance with the relationship in sign between the second frequency component θ2 and the correction signal θt.

Moreover, the estimated angle correction unit 6 is configured to set a value in smaller absolute value out of the second frequency component θ2 and the correction signal θt as the second-frequency-component corrected signal θa when the second frequency component θ2 and the correction signal θt have the same plus or minus signs, and it is thus possible to prevent a state in which the vibration component contained in the estimated angle θ exceeds the actual vibration component, resulting in an increase in the estimation error (θe−θc).

Moreover, the estimated angle correction unit 6 is configured to set the second-frequency-component corrected signal θa to zero when the second frequency component θ2 and the correction signal θt have different plus or minus signs. Thus, when the second frequency component θ2 and the correction signal θt have different signs, an increase in the estimation error (θe−θc) can be suppressed by setting the second frequency component θ2 to 0 because the reliability of any one of the second frequency component θ2 and the correction signal θt is low.

The filter H1(s) (7b) and the filter H2(s) (5b) illustrated in FIG. 3 in the first embodiment may be modified as follows.

(1) Modification Example of Cutoff Frequencies of Filters

In the first embodiment, in the filter H1(s) (7b) and the filter H2(s) (5b), the cutoff frequencies ωh1 and as ωh2 are set to 3 Hz as a frequency higher than the frequency of the steering of the driver. However, it is only required that the vibration component be able to be extracted, and the cutoff frequencies ωh1 and as ωh2 are not limited to 3 Hz. For example, when the vibration occurs at 30 Hz, the cutoff frequencies ωh1 and as ωh2 may be set to 10 Hz so as enable the vibration at 30 Hz to be extracted. Moreover, it is not always required that the cutoff frequencies ωh1 and ωh2 be the same, and, for example, ωh1 may be set to 3 Hz, and ωh2 may be set to 5 Hz. Also in this case, 3 Hz and 5 Hz are frequencies close to each other, and hence similar frequency components can be extracted.

(2) Modification Example 1 of Configurations of Filters

In the first embodiment, the filter H1(s) (7b) and the filter H2(s) (5b) are constructed by the same filters. However, it is only required that the filters be able to extract similar frequency components, and it is not always required that the filters be the same. For example, the cutoff frequencies ωh1 and as ωh2 may be the same, the filter H1(s) (7b) may be a first-order high-pass filter, and the filter H2(s) (5b) may be a second-order high-pass filter. Moreover, the filter H1(s) (7b) may be a first-order high-pass filter, and the filter H2(s) (5b) may be set as a first-order high-pass filter to which a first-order low-pass filter for removing sensor noise is added. Also in those cases, the main frequency components that can be extracted by the filter H1(s) (7b) and the filter H2(s) (5b) are similar frequency components.

(3) Modification Example 2 of Configurations of Filters

The filter L(s) (5a), the filter H1(s) (7b), and the filter H2(s) (5b) are not limited to the combination of the low-pass filter and the high-pass filters, but may be set as a combination of, for example, a band-elimination filter and band-pass filters as given by Expression (15).

$$\begin{cases} H_1(s) = \dfrac{k_b s}{s^2 + 2\zeta\omega_b s + \omega_b^2} \\ H_2(s) = H_1(s) \\ L(s) = 1 - H_2(s) \end{cases} \quad (15)$$

In this expression,
$k_b$: filter gain,
$\omega_b$: filter frequency, and
$\zeta$: attenuation coefficient.

In general, in the electric power steering apparatus, a gain decreases in a high frequency band equal to or higher than several tens of hertz in a transmission characteristic from the output torque of the motor 1 to the steering torque Trq detected by the torque sensor 102. Therefore, a vibration caused by the estimation error (θe−θc) of a high frequency component equal to or higher than several tens of hertz is small, and thus has small influence on the steering, and hence it is not required to correct the estimated angle θ.

Figure 8A:
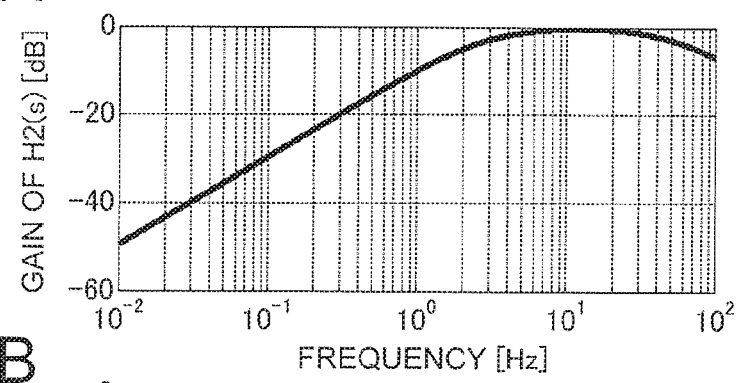
FIGS. 8A and 8B are Bode diagrams for showing gain characteristics of the filter H2($s$) and the filter L(s) in a modification example of the first embodiment of the present invention.
Figure 8B:
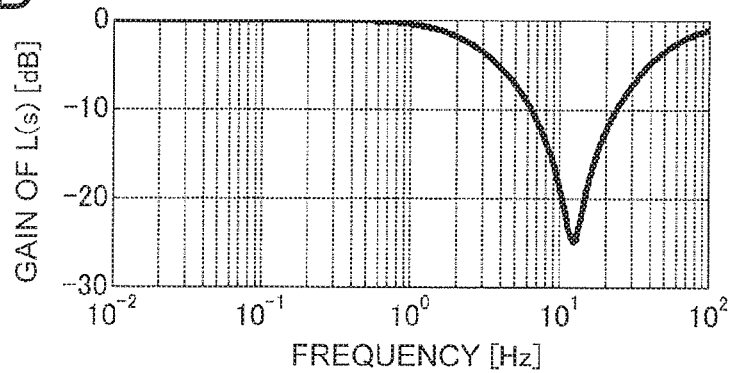

Thus, the filter H1(s) (7b) and the filter H2(s) (5b) set as the band-pass filters have frequency bands equal to or lower than 50 Hz, at which the vibration is large, as pass bands. Further, the filter H1(s) (7b) and the filter H2(s) (5b) have frequency bands equal to or higher than 3 Hz as the pass bands as frequency components higher than the frequency of the usual steering of the driver. FIGS. 8A and 8B are Bode diagrams for showing gain characteristics of the filter H2(s) (5b) and the filter L(s) (5a). FIG. 8A is a diagram for showing the gain characteristic of the filter H2(s). FIG. 8B is a diagram for showing the gain characteristic of the filter L(s). The pass bands of the filter H1(s) and the filter H2(s) are set to the frequency higher than the frequency of the steering of the driver, and hence a frequency component extracted by the filter L(s) given by Expression (15), namely, the first frequency component θ1 contains the frequency component of the steering of the driver.

The first frequency component θ1 contains the frequency component of the steering force of the driver, and thus the steering component of the control angle θc can be calculated from the estimated angle θ, and the vibration component can correct the second frequency component θ2. Thus, and the influence of the motor torque caused by the estimation error (θe−θc) in the rotation angle θe can be suppressed.

Further, when such band-pass filters are set as the filters H1(s) and the filter H2(s), such an additional effect that appropriate correction aiming at a frequency having a large vibration can be made is provided in addition to the effect of the first embodiment. In particular, sensor noise and a detection delay of the torque sensor 102 exist in a frequency band equal to or higher than the pass band of the band-pass filter, and hence influence thereof can be removed by the band-pass filter.

The calculation of the estimated angle θ in the first embodiment is executed through the method of using the induced voltage for the estimation as in Patent Literature 3, but the estimation method is not particularly limited. As long as the calculation of the estimated angle θ is different from the calculation method for the correction signal θt, even when another method not limited to the method of using the induced voltage for the estimation is used to calculate the estimated angle θ, a desired correction can be achieved. For example, as described in Patent Literature 2, an estimation method based on the steering torque Trq detected by the torque sensor 102 may be used. The estimation method in Patent Literature 2 causes the motor 1 to generate a high-frequency torque Tmhf, and calculates the estimated angle θ based on a response appearing in the steering torque Trq detected by the torque sensor 102.

The high-frequency torque Tmhf is generated by supplying the d-axis current command id* and the q-axis current command iq* given by Expression (16).

The d-axis current command id* is obtained by adding a d-axis high-frequency current (command) Aid to a d-axis basic current command id0*.

The q-axis current command iq* is obtained by adding a q-axis high-frequency current (command) Aiq to a q-axis basic current command iq0*.

The d-axis basic current command id0* is determined, for example, based on the rotation speed of the motor 1.

The q-axis basic current command iq0* is determined, for example, based on the steering torque Trq.

The d-axis high-frequency current (command) Aid and the q-axis high-frequency current (command) Aiq are given by a cosine wave and a sine wave having an amplitude A and a frequency ww, respectively. The cosine wave and the sine wave are set to functions of the time "t".

$$\begin{cases} id^* = id0^* + Aid \\ iq^* = iq0^* + Aiq \\ Aid = A \cdot \cos(ww \cdot t) \\ Aiq = A \cdot \sin(ww \cdot t) \end{cases} \quad (16)$$

In the following, for the sake of simple description, the d-axis basic current command id0* and the q-axis basic current command iq0* are 0. The output torque of the motor 1 is provided almost in proportion to the q-axis current command iq*. Therefore, when the estimation error (θe−θc) does not exist, the high-frequency torque Tmhf proportional to a q-axis high-frequency current command Aiq* is generated as given by Expression (17) by supplying electric power to the motor 1 based on Expression (16). In the expression, Kt represents a proportional constant of the output torque of the motor 1.

$$Tmhg = Kt \cdot A \cdot \sin(ww \cdot t) \quad (17)$$

Meanwhile, when the estimation error (θe−θc) exists, a phase difference Δθq occurs between the q-axis high-frequency current Aiq and the high-frequency torque Tmhf as given by Expression (18). Thus, the phase difference Δθq between the q-axis high-frequency current Aiq and the high-frequency torque Tmhf is a signal containing information on the estimation error (θe−θc).

$$Tmhf = Kt \cdot A \cdot \sin(ww \cdot t + \Delta \eta q) \quad (18)$$

The estimated angle θ can be calculated through use of the fact that the phase difference Δθq contains the information on the estimation error. The high-frequency torque Tmhf is reflected to the steering torque Trq detected by the torque sensor 102, and hence the phase difference Δθq can be calculated based on the steering torque Trq. The calculation of the estimated angle θ is executed through feedback control given by Expression (19) so that the phase difference Δθq calculated based on the steering torque Trq decreases.

$$\theta = \left(kpp + \frac{kii}{s}\right) \cdot \Delta \theta q \quad (19)$$

In this expression,
kpp and kii: feedback gains for calculating the estimated angle θ.

In the case of this estimation method, for example, an estimation delay causes the estimation error. In this estimation method, the estimated angle θ is calculated based on the steering torque Trq, which is a method different from the calculation of the correction signal θt. Thus, this estimation method can reduce the estimation error by correcting the second frequency component θ2 based on the correction signal θt, to thereby be able to suppress the torque fluctuation caused by the estimation error.

Second Embodiment

A second embodiment of the present invention is different from the first embodiment in the processing by the estimated angle correction unit 6, and the remaining configuration is the same as that of the first embodiment. Specifically, the processing to be executed when the second frequency component θ2 and the correction signal θt have different signs is different from that of the first embodiment.

Figure 9:
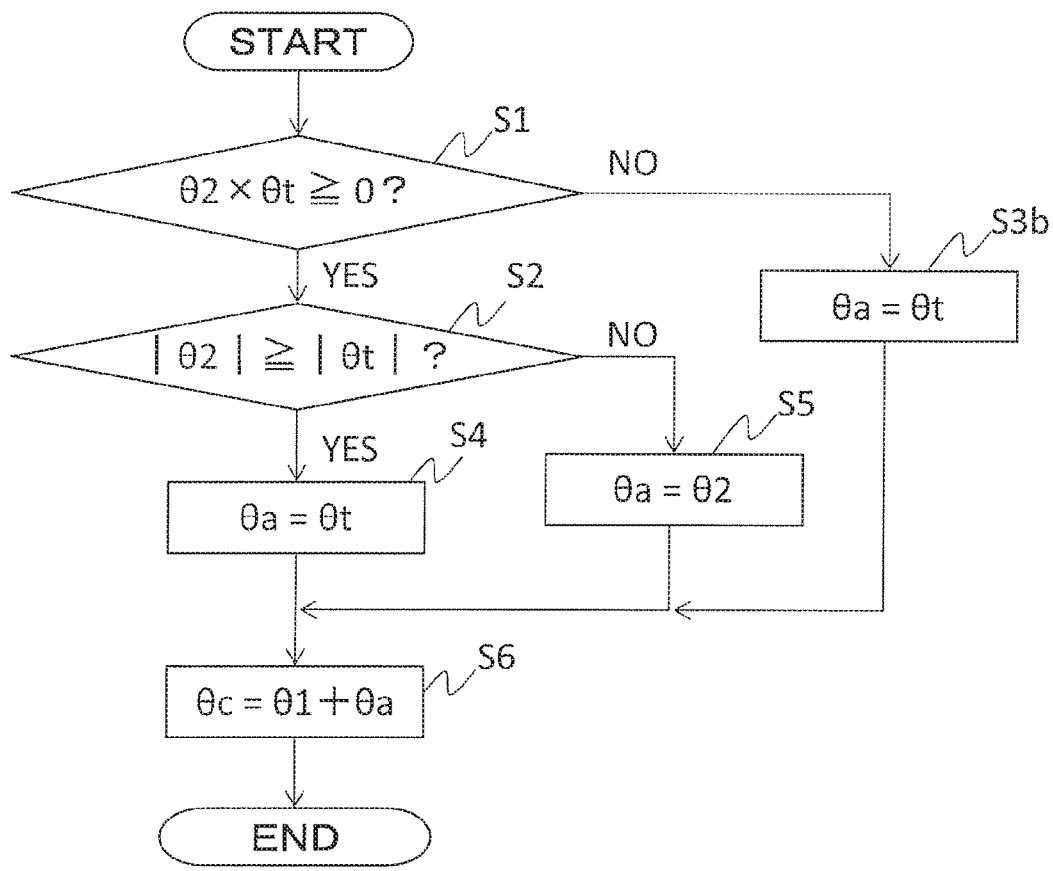
FIG. 9 is a flowchart for illustrating processing by the estimated angle correction unit in a second embodiment of the present invention.

FIG. 9 is a flowchart for illustrating the processing by the estimated angle correction unit 6 in the second embodiment. The second-frequency-component corrected signal θa is calculated so as to correct the second frequency component θ2 based on a relationship in plus or minus sign between the second frequency component θ2 and the correction signal θt.

Specifically, when the second frequency component θ2 and the correction signal θt have the same signs in the relationship in sign (Step S1), a value smaller in absolute value out of the second frequency component θ2 and the correction signal θt is corrected as the second-frequency-component corrected signal θa (Step S2, Step S4, and Step S5). In Step S2, the magnitudes of the absolute values are compared with each other. When |θ2|≥|θt|, θt is set as θa in Step S4. When |θ2|<|θt|, θ2 is set as θa in Step S5. The determination of whether or not the second frequency component θ2 and the correction signal θt have the same signs in the relationship in sign is made based on, for example, whether or not a product of the second frequency component θ2 and the correction signal θt is equal to or more than 0 as in Step S1.

Moreover, when the second frequency component θ2 and the correction signal θt have different signs in the relationship in sign (Step S1), the second-frequency-component corrected signal θa obtained by correcting the second frequency component θ2 is corrected as the correction signal θt (Step S3b).

The control angle θc is calculated by adding the second-frequency-component corrected signal θa to the first frequency component θ1 (Step S6).

With the above-mentioned configuration, the estimated angle correction unit 6 is configured to calculate the correction signal θt as the second-frequency-component corrected signal θa when the second frequency component θ2 and the correction signal θt have different plus or minus signs, and thus the estimation error (θe−θc) can be reduced by considering the reliability of the second frequency component θ2 to be low when the second frequency component θ2 and the correction signal θt have different signs, and thus replacing the second frequency component θ2 by the correction signal θt. As a result, the torque fluctuation caused by the estimation error (θe−θc) can be reduced. The same configuration as that of the first embodiment provides the same effect as that of the first embodiment, Third Embodiment A third embodiment of the present invention is different from the first embodiment in the processing by the estimated angle correction unit 6, and the remaining configuration is the same as that of the first embodiment. Specifically, the method of correcting the second frequency component θ2 is different from that of the first embodiment.

Figure 10:
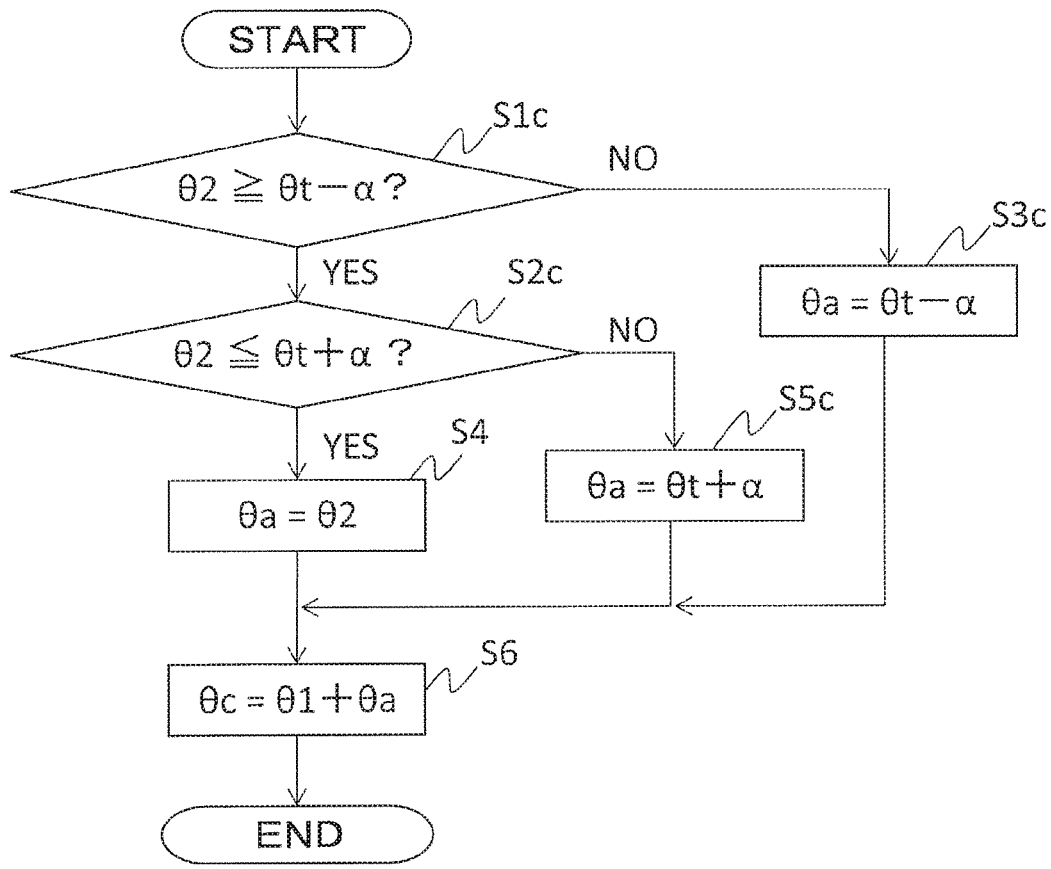
FIG. 10 is a flowchart for illustrating processing by the estimated angle correction unit in a third embodiment of the present invention.

FIG. 10 is a flowchart for illustrating processing by the estimated angle correction unit 6 in the third embodiment of the present invention. As described in the first embodiment, the correction signal θt is a signal corresponding to the actual rotation angle θe of the motor. Thus, correction is made by limiting the second frequency component θ2, which is a vibration component, so that the difference between the second frequency component θ2 and the correction signal θt does not increase, and the difference between the second frequency component θ2 and the correction signal θt falls within a set value a set in advance.

Specifically, when the second frequency component θ2 is smaller than θt−α, the second-frequency-component corrected signal θa is set to θt−α (Step S1c and Step S3c). Moreover, when the second frequency component θ2 is larger than θt+α, the second-frequency-component corrected signal θa is set to θt+α (Step S2c and Step S5c). In the other case, that is, when the second frequency component θ2 falls within a range θt−α≤θ2≤θt+α, the second-frequency-component corrected signal θa is set to θ2 (Step S4).

The control angle θc is calculated by adding the second-frequency-component corrected signal θa to the first frequency component θ1 (Step S6).

As described above, the estimated angle correction unit 6 is configured to limit the second frequency component θ2 so that the difference between the second frequency component θ2 and the correction signal θt falls within the set value α.

Even with this configuration, the second frequency component θ2, which is the vibration component separated from the estimated angle θ, can be corrected through use of the correction signal θt calculated based on the steering torque Trq as the value corresponding to the actual rotation angle θe, and hence the estimation error (θe−θc) in the component of the rotation angle similar to the steering torque Trq can be reduced. The correction can accurately be made through the correction that uses the value corresponding to the actual rotation angle θe, and hence a torque fluctuation caused by the estimation error (θe−θc) can be suppressed. Further, even when a speed of the steering is high, a frequency equal to or lower than a frequency of the steering is not contained in the second frequency component θ2, and hence the second frequency component θ2, which is the vibration component, can be corrected without being influenced by the steering of the driver. The torque fluctuation caused by the estimation error (θe−θc) can be suppressed through the accurate correction, and it is thus possible to provide the electric power steering apparatus capable of executing stable sensorless control with a small vibration. The same configuration as that of the first embodiment provides the same effect as that of the first embodiment.

A control portion including the coordinate conversion unit 32, the voltage command calculation unit 33, and the current command calculation unit 35 of the power supply unit 3, the rotation angle estimation unit 4, the frequency separation unit 5, the estimated angle correction unit 6, and the correction signal calculation unit 7 of the ECU 2 of FIG. 2 may be constructed by individual control circuits, or may altogether be constructed by one control circuit.

Regarding this point, each of the processing circuits for implementing those functions may be constructed by dedicated hardware or a central processing unit (CPU, which is also referred to as "processing unit", "arithmetic unit", "microprocessor", "microcomputer", "processor", or "DSP") for executing a program stored in a memory.

Figure 11A:
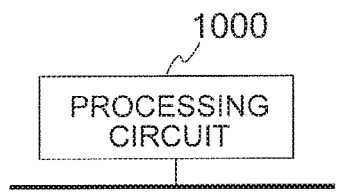
FIGS. 11A and 11B are diagrams for illustrating an example of a hardware configuration of a control unit of the electric power steering apparatus according to the present invention.
Figure 11B:
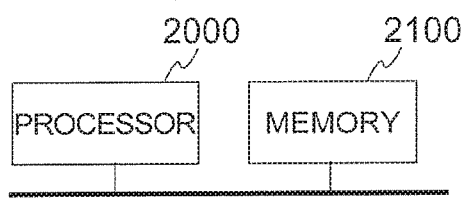

FIG. 11A and FIG. 11B are schematic illustrations of hardware configurations in a case where those functions are constructed by hardware and a case where those functions are constructed by software, respectively.

When the functions of the above-mentioned respective components are constructed by hardware illustrated in FIG. 11A, a processing circuit 1000 corresponds to, for example, a single circuit, a complex circuit, a programmed processor, a processor for a parallel program, an ASIC, an FPGA, or a combination thereof. The function of each component may be implemented by a processing circuit, or the functions of the components may altogether be implemented by a processing circuit.

When the functions of the above-mentioned respective components are constructed by a CPU illustrated in FIG. 11B, the functions of the respective components are implemented by software, firmware, or a combination of software and firmware. The software and the firmware are described as programs, and are stored in a memory 2100. A processor 2000, which is a processing circuit, reads out and executes the programs stored in the memory 2100, to thereby implement the functions of the respective components. Those programs may be considered as programs for causing a computer to execute the procedures and the methods of the respective components. In this case, the memory 2100 corresponds to, for example, a nonvolatile or volatile semiconductor memory such as a RAM, a ROM, a flash memory, an EPROM, or an EEPROM, or to a magnetic disk, a flexible disk, an optical disc, a compact disc, a mini disc, or a DVD.

The function of each component may be implemented partially by dedicated hardware, and partially by software or firmware.

In this way, the processing circuit can implement each of the above-mentioned functions by hardware, software, firmware, or a combination thereof.

Moreover, various types of information required for the processing are set to the circuit in advance in the case of the hardware configuration, and are stored in the memory in advance in the case of the software configuration.

The present invention is not limited to each of the above-mentioned embodiments, and includes all possible combinations of those embodiments.

INDUSTRIAL APPLICABILITY

The electric powersteering apparatus and the method of controlling an electric power steering according to the present invention can be applied to many models of the electric power steering apparatus.

REFERENCE SIGNS LIST

1 motor, 2 ECU, 3 electric power supply unit, 4 rotation angle estimation unit, 5 frequency separation unit, 5a filter L(s), 5b filter H2(s), 6 estimated angle correction unit, 6a calculation unit, 6b addition unit, 7 correction signal calculation unit, 7a conversion unit, 7b filter H1(s), 31 inverter, 32 coordinate conversion unit, 33 voltage command calculation unit, 34 current detector, 35 current command calculation unit, 101 steering wheel, 102 torque sensor, 103 steering shaft, 104 wheel, 105 rack-and-pinion gear, 1000 processing circuit, 2000 processor, 2100 memory

The invention claimed is:

1. An electric power steering apparatus, comprising:
a torque sensor to detect a steering torque of a driver;
a motor to assist in a steering force of the driver;
a rotation angle estimator to estimate a rotation angle of the motor to output an estimated angle;
a correction signal calculator to calculate a correction signal based on the steering torque;
a frequency separator to separate the estimated angle into a first frequency component and a second frequency component;
an estimated angle corrector to calculate, as a control angle, a value obtained by adding a second-frequency-component corrected signal, which is obtained by correcting the second frequency component based on the correction signal, to the first frequency component; and
an electric power supply device to supply electric power to the motor based on the control angle.

2. The electric power steering apparatus according to claim 1, wherein the correction signal is based on a value of a frequency component that is extracted from the steering torque as a frequency component similar to the second frequency component.

3. The electric power steering apparatus according to claim 1, wherein the first frequency component contains a frequency component of the steering force of the driver.

4. The electric power steering apparatus according to claim 1, wherein the correction signal calculator multiplies the steering torque by a conversion gain.

5. The electric power steering apparatus according to claim 4, wherein the correction signal calculator multiplies the steering torque by the conversion gain indicating a ratio between the steering torque and the rotation angle of the motor.

6. The electric power steering apparatus according to claim 1, wherein the estimated angle corrector corrects the second frequency component based on a relationship in plus or minus sign between the second frequency component and the correction signal.

7. The electric power steering apparatus according to claim 6, wherein the estimated angle corrector sets, when the second frequency component and the correction signal have the same plus or minus signs, a smaller one in absolute value out of the second frequency component and the correction signal as the second-frequency-component corrected signal.

8. The electric power steering apparatus according to claim 6, wherein the estimated angle corrector sets the second-frequency-component corrected signal to 0 when the second frequency component and the correction signal have different plus or minus signs.

9. The electric power steering apparatus according to claim 6, wherein the estimated angle corrector calculates the correction signal as the second-frequency-component corrected signal when the second frequency component and the correction signal have different plus or minus signs.

10. The electric power steering apparatus according to claim 1, wherein the estimated angle corrector limits the second frequency component so that a difference between the second frequency component and the correction signal falls within a set value.

11. The electric power steering apparatus according to claim 1, wherein the first frequency component contains a frequency component of the steering force of the driver, and the second frequency component contains a mechanical vibration component.

12. A method of controlling an electric power steering, the method comprising:
estimating a rotation angle of a motor configured to assist in a steering force of a driver, to thereby obtain an estimated angle;
calculating a correction signal based on a detected steering torque of the driver;
separating the estimated angle into a first frequency component and a second frequency component;
calculating, as a control angle, a value obtained by adding a second-frequency-component corrected signal, which is obtained by correcting the second frequency component based on the correction signal, to the first frequency component; and
supplying electric power to the motor based on the control angle.

* * * * *